United States Patent [19]

Klees et al.

[11] Patent Number: 5,222,359
[45] Date of Patent: Jun. 29, 1993

[54] NOZZLE SYSTEM AND METHOD FOR SUPERSONIC JET ENGINE

[75] Inventors: Garry W. Klees, Mercer Island; Gary L. Lidstone, Federal Way; Mark L. Sloan, Renton, all of Wash.

[73] Assignee: The Boeing Company, Seattle, Wash.

[21] Appl. No.: 722,944

[22] Filed: Jun. 28, 1991

[51] Int. Cl.[5] ............... B63H 11/00; F02K 3/02
[52] U.S. Cl. .................... 60/204; 60/226.1; 60/262; 60/271
[58] Field of Search ............ 60/204, 226.1, 226.3, 60/261, 262, 271; 181/215, 216, 219, 220

[56] References Cited

U.S. PATENT DOCUMENTS

| | | | |
|---|---|---|---|
| 4,052,847 | 10/1977 | Rodgers et al. | 60/262 |
| 4,435,958 | 3/1984 | Klees | 60/262 |
| 4,487,017 | 12/1984 | Rodgers | 60/262 |
| 4,548,034 | 10/1985 | Maguire | 60/262 |

OTHER PUBLICATIONS

Thrust Augmenting Ejectors, Part I, by Alperin & Wu at vol. 21, No. 10 of the AIA Journal, Jun. 1982, pp. 1428-1436.
Thrust Augmenting Ejectors, Part II, by Alperin & Wu at vol. 21, No. 12 of the AIA Journal, Jun. 1982, pp. 1698-1706.
NASA Contractor Report 177419 by Dr. Wu prepared for the Ames Research Center in Jul. of 1986, Ames, Iowa pp. 1-28.
Compound-compressible Nozzle Flow by Bernstein, Heiser & Havenor presented at AIAA 2nd Propulsion Joint Specialist Conference at Colorado Springs, Colo., Jun. 13-17, 1966, pp. 1-71.
SNECMA, M88 Catalog, VMST 634, pp. 1-8, Jun. 1991.

Primary Examiner—Richard A. Bertsch
Assistant Examiner—Howard R. Richman
Attorney, Agent, or Firm—Hughes & Multer

[57] ABSTRACT

A supersonic jet engine for improved noise abatement and thrust augmentation. There is an intake section, an engine, a mixing section, an exhaust section, and a secondary air passageway. Ambient air is directed into the engine and into the secondary air passageway. Exhaust from the engine and the secondary air are directed into primary and secondary segments to mix in a stream direction as supersonic flow. Selectively controllable primary bypass passageways are provided at the primary passageway segments and are operated to bypass the primary flow through the primary segments at times when greater primary flow area is required.

4 Claims, 3 Drawing Sheets

NOZZLE SYSTEM AND METHOD FOR SUPERSONIC JET ENGINE

FIELD OF THE INVENTION

The present invention relates to a supersonic jet engine where supersonic primary exhaust is mixed with bypass air so as to operate in at least one mode with supersonic mixed flow, and more particular to a nozzle system and method for such an engine.

BACKGROUND ART

The design of engines that travel at supersonic speeds (e.g. possibly in the range of Mach 2 to Mach 3 at cruise, or possibly higher), involves a number of problems similar to those encountered in the design of sub-sonic jet engines. Thus, there are with both supersonic and sub-sonic engines the general concerns of weight, size, complexity, reliability, cost, etc., and also concerns relative to performance (e.g. thrust, specific fuel consumption, etc.). However, supersonic jet engines pose some special problems. For example, present day optimized designs for supersonic turbojet type engines are characterized in that these have relatively high jet velocities, and also create a high level of noise. Noise suppression in this type of engine is one of the most critical technical problems to be solved in making an environmentally acceptable commercial supersonic jet transport. Another consideration is that a supersonic jet engine must be designed to function adequately through a broad range of operating modes (i.e. take off a climb, acceleration up to supersonic cruise Mach number, as well as being able to cruise at both subsonic and supersonic speeds). Further, the general concern relating to both subsonic and supersonic engine are exacerbated by the more stringent performance requirements imposed on supersonic jet engines.

With regard to noise suppression, over the last several decades, there have been many different systems proposed and/or used for suppressing noise. One general approach has been to mix the higher velocity jet exhaust with lower velocity air, and there are innumerable patents and other technical disclosures relating to variations on this basic concept. However, quite often these mixing type noise suppression will degrade performance. This has been particularly true with supersonic engines. One approach to solve this problem has been to deploy the sound suppressing apparatus in its sound suppressing functioning mode during takeoff and climb and other situations where sound suppression apparatus is needed, and when to provide means by which the noise suppressing apparatus could be "stowed" for other operating modes (e.g. supersonic cruise). However, this takes extra space and adds complexities.

Further, the trend in subsonic turbofan engines has been to build engines with relatively large by-pass ratios so that most of the energy developed by the engine is actually transmitted into the fan. Thus jet noise is lowered and suppression is not required as much. However, in supersonic turbojet engines, when a fan is incorporated in the design, the bypass ratio is generally quite small (e.g. 0.03 to 0.1), and the fan air is often able to provide not too much more than a cooling function. In some instances, it has been proposed to mix the fan air in a supersonic jet engine with the jet exhaust, and this is in some designs incorporated with an after burner. To the best knowledge of the applicant, this mixing would normally occur while both the fan air and the jet exhaust are both subsonic.

In recent years, there have been discussions in the technical literature on ejectors where there is supersonic mixing. For example, in Volume 21, Number 10 of the AIA Journal, there is an article "Thrust Augmenting Ejectors, Part I", written by Morton Alperin and Jiunn-Jen Wu. A second article appeared in Volume 21, Number 12 of the AIA Journal, bearing the title "Thrust Augmenting Ejectors, Part II" by these same authors. There is an analysis of compressible fluids through a thrust augmenting ejector, and these articles deal with two distinct flows after substantially complete mixing has been accomplished. There is the "first solution", where there is subsonic mixed flow and the "second solution", where there is a supersonic mixed flow. Also there is a later publication which is "NASA Contractor Report 177419", which is authored by Dr. Wu, this being prepared for the Ames Research Center in July, 1986, and both first and second solution ejectors and the tests conducted on these are discussed. Also, there is a publication "Compound-compressible Nozzle Flow", authored by Arthur Bernstein, William Heiser and Charles Havenor, presented at the AIAA 2nd Propulsion Joint Specialist Conference at Colarado Springs, Colo., Jun. 13-17, 1966, and this deals with the behavior of two or more gas streams flowing through a single nozzle.

SUMMARY OF THE INVENTION

The present invention relates to a supersonic jet engine installation, and more particularly to a nozzle system and method for such a jet engine. The basic supersonic jet engine installation comprises an air intake means to take in ambient air, an engine, a mixing section, an exhaust section, and secondary air passageway means. The ambient air is directed into the inlet of the engine, and also into the secondary air passageway means. The gaseous exhaust from the engine is directed through primary passageway segments in the mixing section and the ambient air that is directed into the secondary air passageway means flows as secondary air through secondary passageway segments in the mixing section. The primary passageway segments are arranged so that the gaseous exhaust is emitted from the primary passageway segments as primary flow components at supersonic velocity. The engine is also arranged so that the primary flow components emitted from the primary segments mixes in a mixing region of the exhaust section with the subsonic (or desirably near sonic) flow components of the secondary air emitted from the secondary passageway segments, with the mixed flow being emitted as a supersonic mixed flow (i.e., the second solution is achieved).

The present invention is directed particularly to a primary flow bypass means which is arranged to bypass primary exhaust from a location forwardly of the primary passageway segments and is discharged at a downstream location. There is selectively operable primary bypass valve means arranged to close off the primary flow bypass means, or also to open the primary bypass passageway means. In the preferred form, the bypass valve means is arranged to be open to intermediate positions.

In the operation of the engine, the primary flow through the primary passageway segments goes from subsonic to supersonic, and the effective total minimum throat area of this primary exhaust should be matched in accordance with the operating mode of the engine.

During those periods where greater throat area for the primary flow is required, the primary bypass valve means is opened, and during those operating modes where a smaller minimum area for the primary flow is required, the primary bypass valve means is closed. In a preferred embodiment shown herein, the primary bypass means comprises a plurality of tubes or passageways which lead from an upstream location (in the preferred form slightly upstream of related primary passageway segments) to a downstream location. Desirably, the bypass primary flow is discharged back into the main flow of the primary and secondary flow components to be discharged out the final nozzle of the engine.

In the method of the present invention, the bypass passageway valve means are operated in accordance with the requirements of the particular mode of the engine to accomplish the proper operation as described above.

Other features will become apparent from the following detailed description.

DESCRIPTION OF THE PREFERRED EMBODIMENT

The basic configuration of the supersonic jet engine installation 10 of the present invention is described in another U.S. patent application "SUPERSONIC JET ENGINE", being filed concurrently with the present application, naming as the sole inventor Garry W. Klees, who is a co-inventor in the present invention. In the preferred embodiment of that other patent application there is described a mixing section where the primary exhaust flows through a plurality of primary passageway exit segments which are interspersed with a plurality of secondary by-pass air exist passageway segments. Also, in the other application to Garry W. Klees, the throat area of the primary passageway exit segments is arranged so as to enable adjustment of the primary nozzle expansion ratio at the point of confluency of the primary exhaust and the secondary by-pass air. The present invention incorporates a major portion of the basic engine design features disclosed in the above mentioned co-pending application to Garry W. Klees, (entitled "SUPERSONIC JET ENGINE") but shows a modified nozzle system and method.

Figures 1, 2:
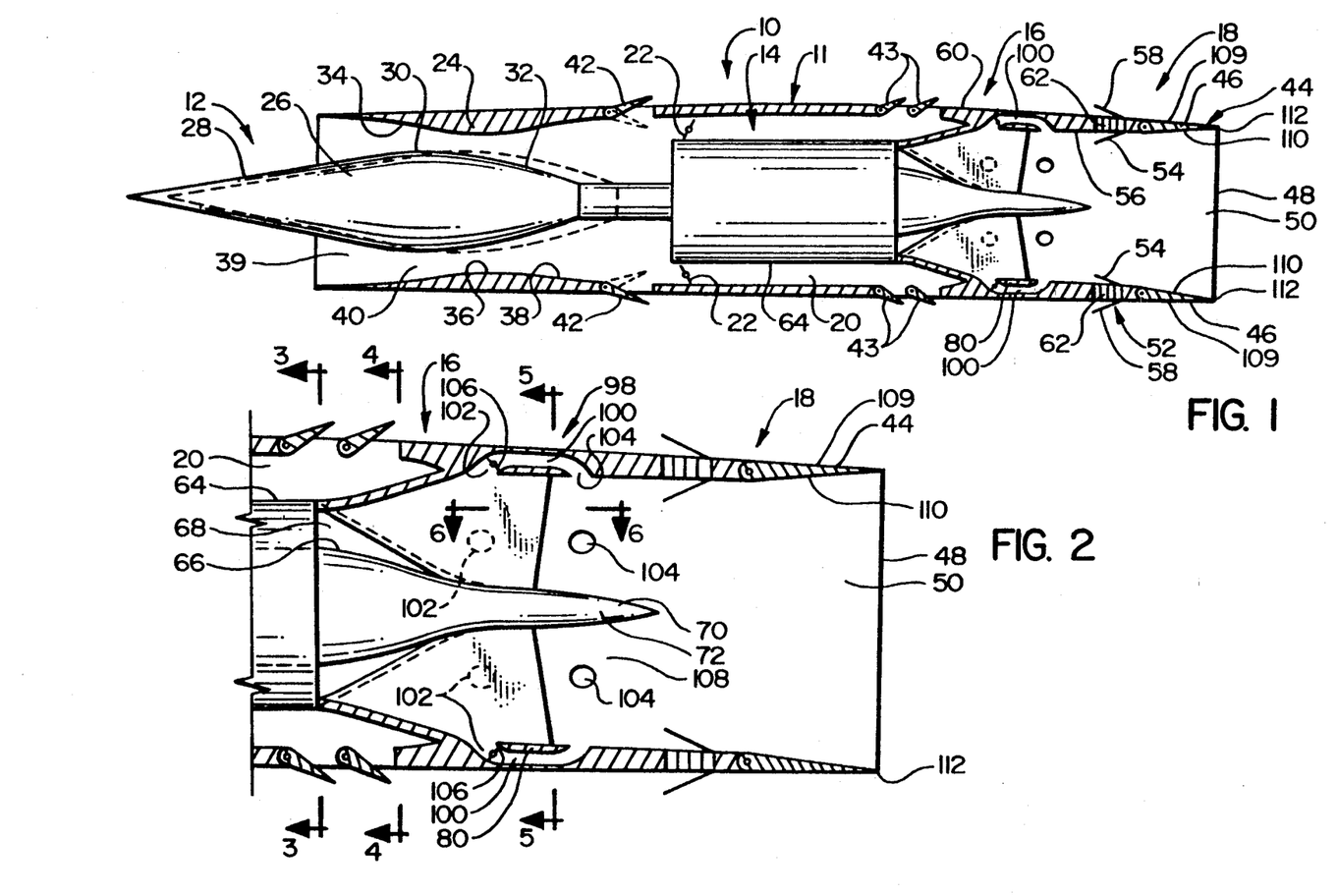
FIG. 1 is a longitudinal sectional view of a preferred embodiment of the engine of the present invention incorporating the nozzle system and method of the present invention.
FIG. 2 is a view similar to FIG. 1, drawn to an enlarged scale, and showing only the mixing section and the discharge section of the engine.
Figure 3:
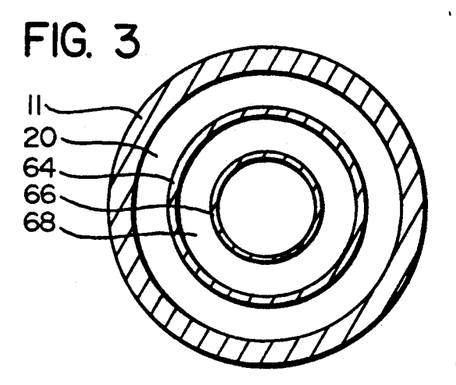
FIGS. 3, 4 and 5 are sectional views taken through lines 3, 4 and 5, respectively, of FIG. 2, illustrating the configuration at locations along the mixing section.

In FIG. 1, there is shown somewhat schematically a supersonic jet engine installation 10 incorporating the teachings of the present invention. This engine installation 10 comprises an outer annular housing 11, an inlet section 12, and engine 14, a mixing section 16, and an exhaust section 18. In addition, there is a secondary air passageway means 20, desirably in the form of an annular bypass duct, defined by the housing 11 and surrounding the engine 14, this passageway 20 leading from the inlet section 12 into the mixing section 16.

The function and operation of the mixing section 16 in cooperation with the secondary air passageway 20 and the other components of the engine are significant in the present invention, and the details of this will be described later in this description. This section 16 is designed to obtain what is called the "second solution" (where there is supersonic mixed flow) for engine thrust improvement, and also for proper noise abatement where the first solution would normally be used. In general, this mixing section 16 functions to direct the exhaust from the engine 14 into a plurality of primary passageway segments which are spaced from one another, and also to direct the second flow from the passageway 20 to a plurality of second passageway segments, which are interspersed with the first passageway segments. In the preferred configuration shown herein, the first and second passageway segments go through a transition portion and end at a downstream location in a plurality of "pie shaped" sections, with the primary passageway exits and the secondary passageway exits being spaced in an alternating pattern.

Further, the primary passageway segments are preferably contoured with a converging diverging configuration to reduce shock cell noise and improve performance, such that the sub-sonic primary flow entering the primary passageway segments turns supersonic as it exits from its expanding primary passageway segments.

It will be noted that the inlet section 12 is properly sized and arranged as a common inlet to supply adequate airflow to both the secondary air passageway 20 and also into the inlet of the engine 14. In addition, there is at the forward entry portion of the secondary passageway 20 a flow control valve means 22 which can selectively block all or part of the flow into the secondary passageway 20.

The inlet section 20 is shown as an axisymmetric inlet, a type which has been used for the U.S. Supersonic Transport and this is at this time the favored inlet configuration. However, other supersonic inlets could be used. Within the broader scope of the present invention, the inlet could have various configurations such as axisymmetric, rectangular, or some other shape. Further, while the preferred form is to have a common inlet to minimize losses as the supersonic inlet air flow turns supersonic downstream of the inlet throat, within the broader scope of the present invention, other arrangements are possible, and the inlet could be, for example, a separate annular passageway, or possibly a plurality of inlet passageways for ambient air. The inlet section 20 shown herein comprises an inlet outer housing portion 24 and a translating center body 26. As is common in the prior art, the center body 26 has a forward surface portion 28 that diverges in a downstream direction, a greater diameter center surface portion 30, and a rear surface portion 32 that converges in a downstream direction. The inlet housing portion has an annular configuration, having a rearwardly converging forward portion 34, a reduced diameter middle portion 36 and a rear surface portion 38 that diverges in a downstream direction. As is well known in the prior art, the housing section 24 and the center body section 26 define a convergent divergent passageway 39, with an intermediate "necked" portion 40. This is desirably a variably geometry inlet where the center body 26 is movable relative to the inlet housing to modify the geometry of the inlet passageway. At the aft end of the inlet housing portion 24, just forwardly of the secondary passageway 20 and also just forwardly of the flow control valve means 22, there are inlet by-pass doors 42 which (as their name implies) function to divert air flow from the inlet passageway downstream of the necked portion 40 to a location outside of the engine when they are moved outwardly. Also these doors 42 can be positioned to extend inwardly to take in additional air, and this is shown in broken lines in FIG. 1. Similar door 43 are provided at the rear end of the secondary passageway 20.

The engine 14 is or may be of conventional turbojet or turbofan design and would normally comprise a forward compressor section, a burner section which receives air from the compressor section, and a turbine section. Since these components are well known in the prior art, these will not be illustrated nor described herein.

The exhaust section 18 comprises a variable area nozzle 44 which is or may be of conventional design. Typically such a variable area nozzle comprises a plurality of flaps 46 which can be moved radially inwardly or outwardly to change the exit area 48 of the exhaust passageway 50. Additionally, a suitable thrust reversing mechanism 52 is provided, this being shown somewhat schematically in FIG. 1. As shown herein, this thrust reverser 52 would comprise selectively operable intake vanes 54 which can be moved from a flush position adjacent to the interior housing surface 56 to a radially inward location to capture the outlet flow, and also a plurality of perimeter outlet vanes 58 which can be moved outwardly from a flush position adjacent to the outer surface 60 of the engine housing 11. A set of turning vanes 62 is positioned in the aft part of the housing structure 11 between the sets of vanes 54 and 58 to redirect the gaseous flow entering into the area defined by vanes 54, and discharging this gaseous flow in a forward direction in a radially outward and forward direction along the radially outward vanes 58.

To describe this mixing section 16 more particularly, reference is now made to FIGS. 2 through 6. The engine 14 has an outer generally cylindrical side wall 64, and an inner wall 66 (see FIG. 2) positioned concentrically within the outer wall 64, and these are extended into the mixing section 16. The downstream portions of these walls 64 and 66 define an annular passageway section 68 which receives the exhaust from the turbine section of the engine 14.

Figure 4:
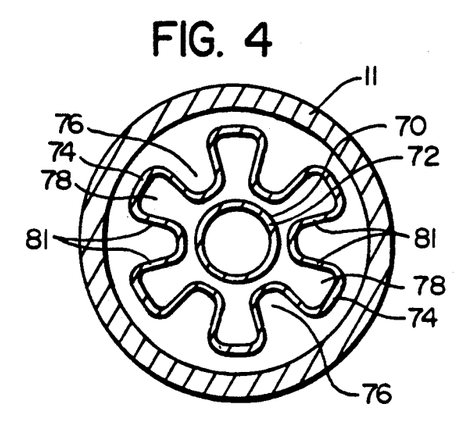
Figure 5:
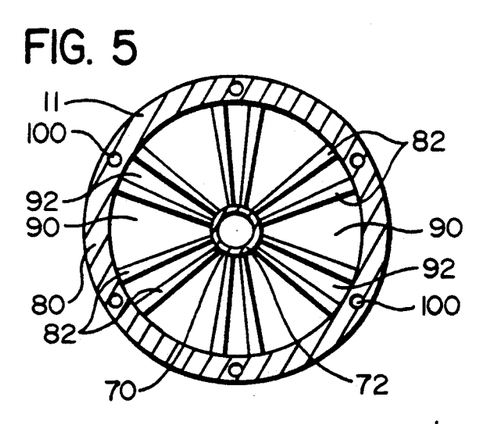

The outer engine wall 64 is contoured in a manner that as it extends rearwardly into the mixing section 16, it goes through a transition from a forward cylindrical configuration to an intermediate "flower" or "lobe" transitional configuration (see FIG. 4), and finally at the exit plane has a substantially "pie shaped" configuration (see FIG. 5), where each passageway section has a substantially triangular shape (as viewed from the transverse plane of FIG. 5). The base of each triangular shape is circularly curved, and the radially inward apex of each triangle is cut-off or terminated at the outer surface 70 of the plug 72 which is an extension of the wall 66 at the exhaust of the mixing section 16. It is to be understood that this contouring of the downstream portion of the wall 64 is accomplished in a manner to provide smooth fluid flow through the mixing section 16. It is to be understood that there could also be a "two dimensional" embodiment where the wall sections forming the passageway exit segments are parallel, and the exhaust pattern could be rectangular rather than pie shaped.

More particularly, as can be seen in FIG. 4, certain spaced portions around the wall 64 slant outwardly in a rearward direction to form radially outwardly positioned lobe portions 74 having intermediate valley 76. At the intermediate location of FIG. 4, the hot exhaust gases continue their rearward flow from the more forward passageway portion 68 into the interior transitional passageway portions 78 defined by the lobes 74, while the secondary air has a portion of its flow traveling radially inwardly into the valley or recesses 76. By the time this flow reaches the exit area (see FIG. 5), the lobe portions 74 extend out nearly to the housing 11. At the aft end of the mixing section 16, there is mounted to the engine housing 11 a circumferential mounting ring 80 which will be described in more detail later herein.

Figure 6:
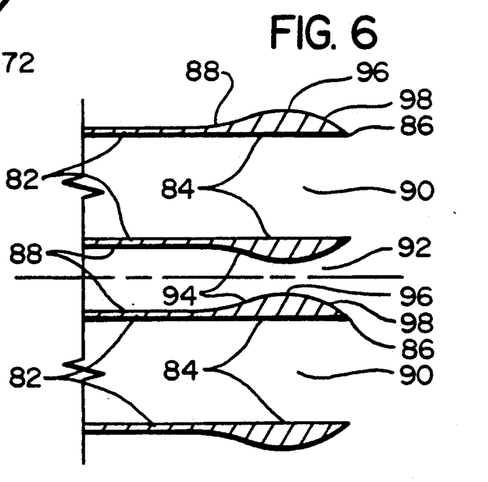
FIG. 6 is a sectional view, drawn to enlarged scale, taken along lines 6—6 of FIG. 2, but showing the wall portions defining the passageway segments as being parallel, instead of their actual converging radial alignment, this being done for purposes of illustration.

To describe the mixing section 16 further, as can be seen in FIGS. 4 and 5, the wall portions 81 that define the valleys 76 continue to go through the transition from the location of FIG. 4 to the location of FIG. 5 so that these become planar radially extending rear wall portions 82 arranged symmetrically at the exit area 16. As can be seen in FIG. 6 each rear wall portion 82 has a first side surface 84 which remains substantially planar all the way to the rear edge 86, and adjacent pairs of facing wall surfaces 84 define a related exiting flow passageway segment for the secondary air. The opposite side surface 88 of each rear wall portion 82 defines with each adjacent wall surface 88 a related convergent/divergent exit flow passageway segment for each flow path of the primary exhaust. The pie-shaped secondary exit passageway portions are designated 90, while the pie-shaped primary exit passageway portions are designated 92. As can be seen in FIG. 6, the surface portions 88 each have a forwardly convergent portion 94, an intermediate necked portion 96, and a rear diverging surface portion 98. Thus, each primary exhaust path section enters the converging portion of the passageway 92 subsonically, and as it passes the necked passageway portion defined by the two necked surface portions 96, it turns supersonic and exits supersonically into the mixing area immediately aft of the downstream rear edge portions 86 of the wall sections 82.

Since the wall sections 82 converge toward one another in a radially inward direction, it is to be understood that the passageway portions 90 and 92 decrease in width as these approach the longitudinal center axis of the engine 10. In like manner, the contoured surfaces 94, 96 and 98 would be scaled down generally proportionally in a radially inward direction. It should be noted that in the showing of FIG. 6, for convenience of illustration, the wall sections 82 have not been drawn in their true configuration of converging in a radially inward direction. Rather, the cross-sectional configuration has simply been shown at one location, and FIG. 5 actually shows the converging pattern more accurately.

As the primary exhaust flows out the passageway sections 92, it mixes with the secondary air flow passing out the passageway sections 90, and this mixing continues in a downstream direction through the exhaust section 18. At this point, it should be indicated that in the preferred embodiment shown in the related application "SUPERSONIC JET ENGINE", which was mentioned above and which is being filed concurrently with the present application, there are provisions for plug elements having a converging/diverging configuration which are positioned at the aft end of the primary exhaust passageways 92. These plug elements in that other application are utilized to control the area and geometry of the passageways 92. While it is conceivable that such plug elements or other means for varying geometry of these passageways 92 could be utilized in the present invention, the present invention is to provide a nozzle means where such plug elements or other devices would not be necessary, or at least the need for these would be minimized.

To return to the description of the present invention, one of the primary objectives of the present invention is to permit the effective flow area of the primary exhaust to be increased or decreased by means of by-pass exhaust passageways. More specifically, in the preferred form, the outer housing portion 98 at the location at the aft end of the mixing section 16 is formed with a plurality of longitudinally extending by-pass tubes forming bypass passageways 100. Each passageway 100 has an upstream primary exhaust entry port 102 at a location upstream of its related convergent/divergent passageway 92, and a downstream exhaust port 104 at a location downstream of the exit area of its related convergent/divergent primary nozzle passageway section 92. Also, each passageway 100 is provided with a related flow control valve 106 which can totally close off flow through its related passageway 100, permit full flow through its related passageway 100, or be opened to various intermediate positions for partial flow therethrough.

In the operation of the engine 10, during those operating modes where the minimum flow area of the primary exhaust should be larger, the control valves 106 are opened to permit a portion of the primary exhaust flow to flow through the passageways 100 and then exit from the tubular passageway 100 through the exhaust ports 104 and enter into the main mixing exhaust passageways 108 in the exhaust section 18. Under circumstances where the flow area of the primary exhaust should be less, the control valves 106 are closed. During certain operating modes, the by-pass control valves 106 could be moved to intermediate positions.

The exact manner in which the primary exhaust by-pass passageways 100 are utilized will depend to a large extent on the operating characteristics of the core engine 14. For example, in many supersonic turbojet engines, the minimum area for the primary exhaust would be smaller for relatively high power settings, but more open at, for example, supersonic cruise. However, in one proposed supersonic engine design where an augmenter is normally used for climb power and take-off, the throat area of the primary exhaust may be at a maximum during those operating modes, and may be closed down somewhat for thrust-equals-drag conditions, which would be just the opposite of certain other supersonic engines. Thus, the main thrust of the present invention is that these by-pass tubes or passageways 100 entirely or substantially alleviate the need for having variable area control at the location of the exhaust passageways 92.

With regard to the exhaust section 18, as indicated earlier, the flaps 46 can be moved inwardly and outwardly to decrease or increase the effective nozzle area. The flaps 46 are configured so that in the preferred maximum area position (shown in full lines in FIG. 1), the outer surfaces 109 of these flaps are aligned with the exterior surface 60 of the outer engine housing 11 so as to form a continuous aerodynamic surface along the outer engine sidewall. Also, with the flaps 46 in their expanded position, the inner surfaces 110 of the flaps 46 collectively define a rearwardly diverging passageway leading to the end edge 112 at which the surfaces 109 and 110 meet.

With the foregoing in mind, there will now be a description of the overall operation of the engine 10, and this description will in large part be quite similar to that presented in the co-filed application "SUPERSONIC JET ENGINE", co-filed with the present application.

Let us first consider the operation of the engine installation 10 during cruise, and for the sake of example, let it be assumed that the engine installation 10 is designed to cruise at Mach 2.4. Ambient air enters into the inlet section 12, and as it flows past the necked passageway portion 40, the intake air turns subsonic. A portion of the air passing into the inlet goes into the air inlet of the engine 14, while the rest of this air goes into the passageway 20 as secondary by-pass air or aspirated air. As indicated previously, as the secondary or by-pass air moves from the passageway 20 into the mixing section 16, this secondary by-pass air is directed into the valleys 76 and then exits through the secondary pie shaped passageway segments 90.

At the same time, the exhaust from the core engine 14 passes into the mixing section and through the interior transitional passageway portion 78 and exits through the pie-shaped primary exit passageway segments. The primary exhaust goes supersonic as it passes through the convergent/divergent primary passageway segments 92.

As the flow components of the primary exhaust and the secondary air go beyond the exit plane of the mixing section 16, the primary exhaust components and the secondary air components begin to mix. This mixing continues as the two gaseous flows pass through the exhaust section 18. The mixing section 16 and the exhaust section 18 are arranged so that substantially complete mixing of the primary exhaust and the secondary air will occur at a location upstream of the trailing edge 112 defined by the flaps 46. In this supersonic cruise mode, the engine installation 10 is arranged so that the mixed flow downstream of the mixing section 16 is supersonic (i.e. in the "second solution" which was discussed previously). The effect of this is that there is a significant improvement of net thrust over what would normally be achieved by present day state of the art supersonic jet engines. While the reasons for this are quite complex, at least a partial explanation can be given with reference to FIG. 7.

Figure 7:
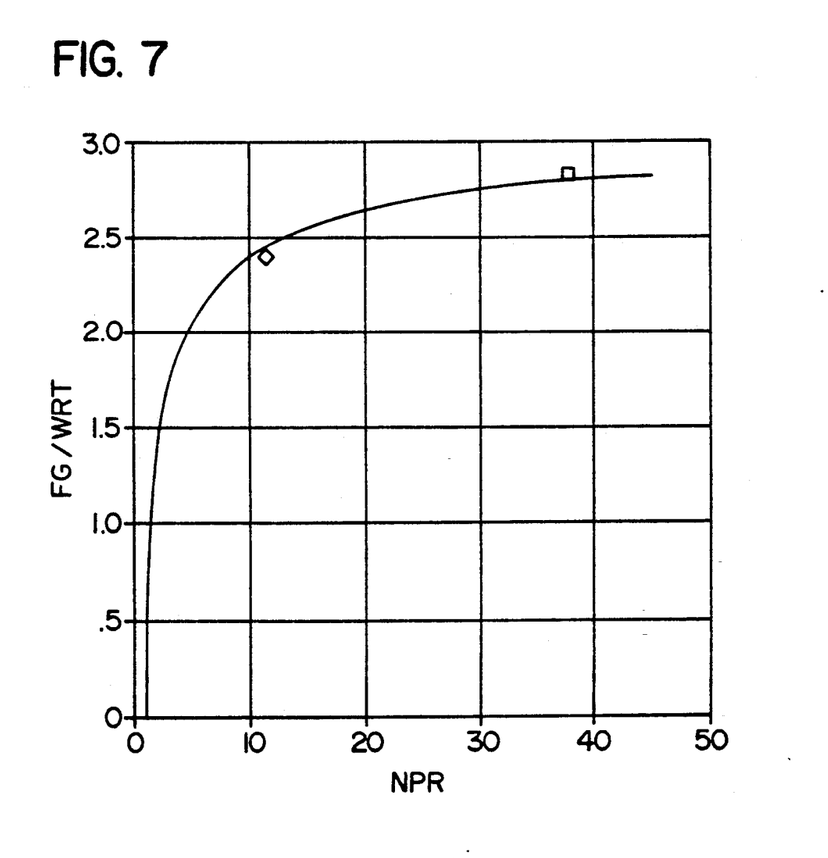
FIG. 7 is a graph where values of pressure ratio and primary flow ambient atmosphere is plotted against specific thrust.

In FIG. 7, there is shown a graph where the values for specific thrust are along the vertical axis, and the nozzle pressure ratio is given along the horizontal axis (the nozzle pressure ratio being the total pressure of the gaseous flow creating the thrust relative to ambient pressure). It can be seen that as the pressure ratio increases from a little above zero to a value of about eight, the increase in specific thrust is rather rapid. From there on, the curve begins to flatten out somewhat, until the pressure ratio gets up to about twenty five, and beyond this, the increase in thrust is not as large.

At supersonic cruise (e.g. at Mach 2.4), the pressure ratio of the primary exhaust (again, measuring total pressure) to ambient pressure can be as high as thirty eight to one. At that same Mach number, the pressure ratio of the secondary air would be possibly at about eleven to one. In the preferred embodiment of the present invention, the mass flow of the primary exhaust and the secondary air would be approximately equal, with this varying to some extent, depending upon design criteria and other conditions. On the assumption that the two mass flow rates are about equal, when the two gas flows are mixed, the resulting pressure ratio would be at a value of approximately twenty four and a half to one. It can be seen that the specific thrust achieved when the pressure ratio is twenty four and a half to one is slightly less than the thrust which would be achieved when the pressure ratio is at thirty eight to one. On the other hand, there is a relatively much larger increase in specific thrust from a pressure ratio of eleven to one to a pressure ratio of twenty four and a half to one. Since the mass flow of the mixed gaseous flow is twice that of the primary exhaust individually and twice that of the secondary exhaust individually, it is apparent that the specific thrust of the mixed flow is greater than the specific thrust that would be achieved by adding the thrust components contributed by the primary exhaust and the secondary air separately if these two were unmixed.

The above explanation is obviously a somewhat simplified and incomplete explanation, and the full explanation would involve the balancing of a large number of other factors, pertaining not only to the specifics of designing the engine to accomplish the functions of the present invention, but also the analysis of the laws of thermodynamics governing the mixing process.

As indicated previously, a significant aspect of the present invention is the noise reduction accomplished. The mixing of the primary exhaust exiting from the pie shaped segments 92 with the secondary air exiting from the bypass passageway segments 90 substantially reduces the noise level.

With the foregoing in mind, let us now review the operation of the present invention from take-off up to supersonic cruise. The following description of mode of operation will be made with reference to one design of a subsonic jet engine of the present invention which is optimized to cruise at about Mach 2.4.

During take-off, noise suppression is, of course, critical. At take-off, the inlet plug 26 is at its furthest forward position for maximum throat area. Further, the by-pass doors 42 are open in an inwardly facing direction so that these act as flush inlets to take in yet additional ambient air. The by-pass passageway valve means 22 is fully open, and the primary bypass valves 106 in the mixing section 16 are closed. The final nozzle 44 is set so that the final nozzle area is about ten percent less than the total area of the mixing region that is immediately downstream of the rear edges 86 of the wall portions 82. In this operating condition, the engine 10 develops sufficient thrust for take-off and climb. At the same time, the flow of secondary air through the passageway 20 and through the mixing section 16 and exhaust section 18 functions to mix with the primary exhaust in a manner to suppress sound. During the take-off and climb up to about Mach 0.6 the engine 10 is desirably operated so that the mixed flow (i.e. the combined flow of the primary exhaust and the secondary air) is subsonic (i.e. in the "first solution"), primarily for reasons of noise reduction.

Also, during take-off and through initial climb, acoustic lining would be used to absorb the mixing noise, and this would generally be deployed in the mixing area that is immediately downstream of the mixing section 16. Also, as the airplane increases its speed during climb up to Mach 0.6, the by-pass doors 42 are gradually closed as the speed of the aircraft increases, until at about Mach 0.6, the by-pass doors 42 are fully closed. Also when the airplane reaches a speed of about Mach 0.6, if deployable acoustic lining is used, it would be moved to its stowed position so as not to detract from the performance of the engine.

Also, at about Mach 0.6, the aircraft will have likely reached a location where the noise suppression is less critical, and it is then desired to operate the engine in a manner that the mixed flow passing out the final exhaust section is supersonic (i.e. operating in the "second solution"). The manner in which this is accomplished will be described later herein, and at this point we will assume that this has been accomplished so that from Mach 0.6 on up through supersonic climb, the mixed flow is supersonic. (As indicated previously, with this mixed flow being supersonic, a significant increase in specific thrust is experienced).

As the aircraft is traveling from take-off up to about Mach 0.6, the exit area of the final nozzle is reduced, and then the area of the final nozzle begins expanding from Mach 0.6, so that at about Mach 1.0 the area of the final nozzle is about fifty percent of the total area of the mixer. At about Mach 1.6, the final nozzle 44 would be set at about seventy five percent of the total area at the exit plane of the mixing section 16.

As the airplane continues up through climb, during which the airplane is accelerating up toward Mach 2.4, the final nozzle 44 will continue to have its area expanded, and as the airplane is still climbing (and closely approaching Mach 2.4), the final nozzle area is about fifty percent greater than the total mixing area at the exit plane of the mixing section 16. At this point, the airplane begins to operate at supersonic cruise (at Mach 2.4 in the present example) where thrust equals drag, and the area of the final nozzle 44 would be substantially equal to the total cross-sectional area of the engine. It should be noted that the operating sequence described immediately above is based upon the assumption that there is not variable wall geometry in the mixing section 16. Such variable wall geometry will be discussed later herein.

Also, at supersonic cruise (i.e. at Mach 2.4) in the particular design in connection with which this operating sequence is given, the secondary air valve means 22 is closed down moderately to reduce the flow of secondary air into the passage 20. In this particular instance, this is done to obtain a better overall balance in performance. This reduction of the secondary air flow by closing the valve means 22 moderately causes some thrust loss at cruise, but does improve performance at other operating conditions. This helps to maintain the smallest possible inlet to reduce transonic by-pass and spillage drag. The moderate closing down of the by-pass valve 22 would possibly begin at a little bit below cruise speed of Mach 2.4 while the airplane is still in the climbing mode. A current analysis indicates that this would begin possibly at about Mach 2.2, and then gradually close down to some extent until cruise speed at Mach 2.4 is reached.

As the airplane starts at take-off and goes up through climb, the inlet center body 26 is adjusted to some extent throughout this period, and it would possibly be moved further rearwardly so as to reduce the throat area and also to locate the shockwaves coming off the front point of the center body plug so as to minimize inlet drag. At supersonic cruise where thrust equals drag at Mach 2.4, the center body plug 26 in the inlet is moved further rearwardly to open the throat by about twenty percent in area. Also, at supersonic cruise the primary control valves 106 in the mixing section 16 are opened so as to increase the effective throat area of primary passageway segments 92 by about twenty per cent of area.

As a practical matter, there would be very few flight conditions where the primary flow through the primary bypass tubes or passageways 100 would be throttled so that the primary control valves 106 are in partially open positions, and these would not occur at major fuel consuming conditions. This would likely be true, regardless of the type of engine that would be used with the present invention. The bypass passageways 100 would be either fully closed (such as at any maximum power condition), or fully wide open (as it is at any thrust equals drag situation, such as supersonic or subsonic cruise).

Obviously, the primary bypass air passing through the tubes 100 can be introduced back into the mixing area in various ways, such as with a flush round exit opening, as shown at 104, or by way of a circumferential slot at only the primary exit passageways 92 or over the secondary passageway exit portions 90.

In the particular design with regard to which the above operating sequence is given, the by-pass duct 20 is sized, relative to the engine 14, so that the mass flow of the air in the secondary passageway 20, when the valve means 22 is wide open, would be about equal to the mass flow of the exhaust from the core engine. In terms of actual cross-sectional area, the cross-sectional area of the secondary duct 20 would be somewhat larger (possibly fifty percent larger) than the flow area of the secondary flow at the mixing plane, and about 2.5 times larger than the primary flow area at the mixing plane.

With regard to the primary exhaust passageway segments 92, the area at the throats created at the exit primary passageway sections 92 would be about one fifth of the total mixing area immediately downstream of the tail end 86 of the wall section 82. Also, the area of the by-pass duct 20 would be about fifty percent greater than the total mixing area at the rear edges 86 of the wall section 82. This would help keep the losses down for the by-pass air flowing through the duct 20, and this by-pass area will begin to accelerate as it goes into the mixing area and thus require a smaller cross-sectional flow area.

As indicated previously, while in the presently described embodiment the engine 14 is a turbojet-type engine, this engine 14 could also be a fan jet engine. If so, it would normally be expected that there would be some mixing of the primary exhaust and the fan air prior to going out the nozzle of the fan engine. Further, the exhaust from the turbofan engine (if used in the present invention), could be heated by an after burner. Within the broader scope of the present invention, the engine 14 is simply an engine adapted to be constructed and designed to provide thrust adequate for operation as a supersonic engine, and the precise configuration of this engine 14 could take various forms.

It was mentioned earlier that in the preferred form of the present invention, for noise abatement the engine installation 10 would be operating in a manner that during take-off and through climb up to an intermediate supersonic speed (e.g. Mach 0.6), the engine would desirably be operated with the mixed flow being subsonic (i.e. in "solution one"), and that thereafter, for improved performance it is desirable that the mixed flow passing out the final exhaust nozzle be supersonic (i.e. in "solution two"). Operation in "solution one" is fairly easy to demonstrate in a test. However, analytical and test results have demonstrated that it may be considerably more difficult to achieve "solution two" mode of operation, at least in a test setup. Accordingly, it is contemplated that it may be necessary to have a special starting feature or special physical controls to insure the ability to operate in the "solution two" mode. As indicated previously, there is a significant benefit, since this could provide significant thrust improvements over the whole mission, particularly at supersonic cruise.

Certain analytical work which has been done in connection with this matter indicates that "second solution" mode of operation is quite easy to simulate in "one dimensional" analysis, but that such an analysis does not necessarily give adequate information as to how the "solution two" mode can be achieved in a real system on a time-dependent basis. In addition to extensive one dimensional analysis, certain 2-D and 3-D computational fluid dynamic analysis (CFD Analysis) has shed considerable light on this problem. It is contemplated that a forthcoming test is to be conducted by the assignee of the present invention (i.e. The Boeing Company) in the near future to shed further light on this matter, and this will be used to attempt to verify proposed control logic, as well as device to accomplish it. At this time, it is believed that the procedure described immediately below is a reasonable means of accomplishing the "solution two" mode of operation adequately.

One system and method for properly accomplishing the "solution two" mode of operation is disclosed in a patent application (CONTROL SYSTEM AND METHOD FOR SUPERSONIC ENGINE WITH SUPERSONIC EJECTOR), naming Garry W. Klees, Gary Lidstone and Robert K. Henke as co-inventors, which patent application is being filed concurrently with the present application.

To describe this more fully, let us assume that the engine installation 10 is operating as described above in climbing through the subsonic range and the aircraft which the engine is powering is climbing at approximately Mach 0.6, and that it is desired to change from the "solution one" mode (which is desirable for sound suppression), into the "solution two" mode. The final nozzle 44 is moved to a relatively small area position so that it matches the required flow area under circumstances where the engine is operating in the "second solution" mode at that power setting and Mach number with the by-pass duct 20 open (i.e. with the secondary flow valve means 22 at the open position). At approximately this time, the secondary flow valve means 22 is essentially closed to shut off the flow of secondary air through the passageway 20. At this time, the only flow through the final nozzle 44 would be the primary exhaust which is supersonic, since the primary exhaust flow turns supersonic as it passes from the passageway segments 92 in the mixing section 16. i.e. the primary flow has much higher than critical pressure ratio (normally about 9:1, with critical at 1.8:1.

When the secondary flow valve 22 is closed, the inlet section 12 may by-pass excess air through the inlet by-pass doors 42 to provide minimum inlet drag. The ejector secondary flow valve means 22 is then gradually opened to initiate the flow of secondary air through the mixer and this flow gradually increases. The air begins mixing with the supersonic flow of the exhaust gas downstream of the exit plane of the passageway segments 90 and 92 to provide mixed supersonic flow, and this continues as the valve means 22 continues to be open to the fully open position, at which time the entire mixed flow should be supersonic. With the supersonic mixed flow achieved, the flaps 46 of the final nozzle 44 may then be positioned at any a larger area position to achieve the best nozzle performance, depending on the operating modes.

A similar procedure would be followed by an engine out, an inlet unstart, an engine surge, or any unforseen nozzle unstart. It is surmised that the sequence of events is critical to the success of this operation. For example, if the secondary air were to remain substantially at full flow during starting of the "solution two" mode, quite possibly the secondary duct would choke at the mixing plane at the rear end of the mixing section 16, and then if the primary flow is brought up to pressure, there would be a normal shock produced at the end of the mixing process which would not propagate through the nozzle, and it could not be started, and it would then operate only in the subsonic mode.

A restriction in the passageway downstream of the mixing section could be used to enhance the control of the secondary flow and also to accomplish other objectives.

Also, other features could be modified or incorporated in the present application without departing from basic teachings of the present invention.

What is claimed is:

1. A method of operating a jet engine installation
  a. providing an engine having an air inlet and an outlet to discharge engine exhaust;
  b. providing a secondary air passageway means;
  c. receiving ambient air in an air inlet means and providing said ambient air as primary air to said engine inlet and secondary air to said secondary air passageway means;
  d. providing a mixing section having an inlet portion and an exit portion, utilizing said mixing section in directing the exhaust from the engine to primary exit passageway segments, where said exhaust is discharged at supersonic velocity as primary flow components, and directing secondary air flow from said secondary air passageway means to secondary exit passageway segments which are interspersed with said primary segments and from which said secondary air is discharged at subsonic velocity as secondary flow components,
  e. providing an exhaust section to receive said primary and secondary flow components in a mixing region and causing said primary and secondary flow components to mix to create a supersonic mixed flow, said exhaust section having a variable area final nozzle through which said mixed flow is discharged,
  f. providing primary flow bypass means, and operating said primary flow bypass means to increase or decrease effective flow area of said primary passageway segments by bypassing primary exit flow around said primary exit passageway segments where greater flow area is required for said primary segments, and closing off said primary flow bypass means under circumstances where lesser effective flow area is required for said primary segments.

2. A supersonic jet engine installation comprising:
  a. an engine having an air inlet and an outlet to discharge engine exhaust.
  b. means defining a secondary air passageway means;
  c. an air inlet means arranged to receive ambient air and to provide said ambient air as primary air to said engine inlet and secondary air to said secondary air passageway means;
  d. a mixing section having an inlet portion and an exit portion, said mixing section being arranged to receive the exhaust from the engine and to direct said exhaust to primary exit passageway segments, where said exhaust is discharged at supersonic velocity as primary flow components, and to receive secondary air flow from said secondary air passageway means and to direct said secondary air flow to secondary exit passageway segments which are interspersed with said primary segments and from which said secondary air is discharged at subsonic velocity as secondary flow components,
  e. an exhaust section to receive said primary and secondary flow components in a mixing region where said primary and secondary flow components mix to create a supersonic mixed flow, said exhaust section having a variable area final nozzle through which said mixed flow is discharged,
  f. primary flow bypass means which is arranged to bypass primary exhaust from a location upstream of the primary passageway segments and to discharge bypass primary flow at a downstream location,
  g. a primary bypass valve means to selectively open and close said primary flow bypass means.

3. The engine installation as recited in claim 2, wherein said primary bypass means directs the bypass primary flow into a flow area of said primary and secondary flow components.

4. The engine installation as recited in claim 2, wherein said primary bypass means comprises a plurality of bypass passageways, each extending upstream from a related primary segment to a location downstream of said primary segment.

* * * * *